(12) United States Patent
Kitamura

(10) Patent No.: US 6,844,945 B2
(45) Date of Patent: Jan. 18, 2005

(54) HOLOGRAM HAVING AUTHENTICATING INFORMATION RECORDED THEREIN

(75) Inventor: Mitsuru Kitamura, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 33 days.

(21) Appl. No.: 10/307,443

(22) Filed: Dec. 2, 2002

(65) Prior Publication Data
US 2003/0156305 A1 Aug. 21, 2003

(30) Foreign Application Priority Data
Nov. 30, 2001 (JP) ........................................ 2001-365628
Oct. 15, 2002 (JP) ........................................ 2002-299874

(51) Int. Cl.⁷ ................................................ G03H 1/00
(52) U.S. Cl. ......................................................... 359/2
(58) Field of Search ............................. 359/2, 200, 15, 359/22, 566

(56) References Cited

U.S. PATENT DOCUMENTS

| 4,119,361 A | 10/1978 | Greenaway |
| 4,304,809 A | * 12/1981 | Moraw et al. ................. 359/2 |
| 4,537,504 A | 8/1985 | Baltes et al. |
| 4,544,266 A | 10/1985 | Antes |
| 6,121,994 A | 9/2000 | Kuribayashi et al. |

FOREIGN PATENT DOCUMENTS

| EP | 0 916 506 A2 | 5/1999 |
| JP | 9-319290 | 12/1997 |
| JP | 11-21793 | 1/1999 |
| JP | 2000-214750 | 8/2000 |
| JP | 2001-13858 | 1/2001 |
| WO | WO 00/21033 A1 | 4/2000 |

OTHER PUBLICATIONS

Japanese Abstract No. 03226775, dated Oct. 7, 1991.

* cited by examiner

Primary Examiner—Euncha P. Cherry
(74) Attorney, Agent, or Firm—Sughrue Mion, PLLC (57) ABSTRACT

The invention relates to a hologram having authenticating information recorded in such a way that the information is little viewable in an ordinary viewing state and so having high counterfeit-proofness. In a 3D image-reconstructing hologram 10, a minute object 11 that is authenticating information is located behind a shielding block 12 of visually easy-to-perceive size, so that the authenticating information is hidden by the shielding block in a given viewing direction and so is not exposed to view, but can be viewed from a direction different from said given direction.

19 Claims, 7 Drawing Sheets

FIG. 7

HOLOGRAM HAVING AUTHENTICATING INFORMATION RECORDED THEREIN

BACKGROUND OF THE INVENTION

The present invention relates generally to a hologram that has authenticating information recorded therein, and more particularly to a hologram wherein there is recorded authenticating information that is difficult to view in normal viewing states.

So far there have been known counterfeit-proof means for recording authenticating information by printing of as fine patterns as cannot be copied with copiers. However, such counterfeit-proof means are on the way out because recent performance improvements in copiers enable even fine patterns to be copied.

More recently, techniques for forming fine patterns by means of diffraction gratings have been developed (see patent publication 1 referred to later), and are now still available as counterfeit-proof means because it is possible to record authenticating information of as fine size as cannot perceive its shape visually.

In any case, the authenticating information is recorded directly on a given recording surface. Therefore, one can immediately see through what information is recorded by observation under a loupe or microscope. Further, if what information is recorded can be seen through, it is then easy to forge that information, because easier access is now given to devices for recording fine diffraction gratings.

To avoid direct formation of the shape of authenticating information on a recording surface, on the other hand, it has also been attempted to record authenticating information by holography (see patent publication 2). Holography requires a life-sized object, but it is difficult to fabricate an object of visually hard-to-perceive size. For this reason, this patent publication 2 shows an example of the method for implementing lens reductions simultaneously with holography using a negative plane image as a subject.

This holographic method for fabricating a hologram that reconstructs a fine 3D image, however, is practically not preferable because of some restrictions on the size, position, alignment precision, etc. of the object to be used.

On the other hand, a computer-generated hologram (CGH) is fabricated using a computer, for which only the storage as digital data of the shape and location of an object is needed, lightens many such restrictions on the object, and so is desired for the fabrication of 3D image-reconstructing holograms.

Patent publication 1: JU-A 2,582,847

Patent publication 2: JP-A 11-21793

Patent publication 3: JP-A 2-165987

Patent publication 4: U.S. Pat. No. 4,568,141

Non-patent publication 1:

"99-3D Image Conference '99", a CD-ROM version of lecturing monographs (at the Shinjuku schoolhouse, Kogakuin University), an article entitled "Image-type CGH by means of e-beam printing (3)—enhancement of 3-D effect with hidden surface removal and shading—"

Even given a visually hard-to-perceive fine 3D image, however, it is possible to see through the authenticating information recorded therein by observing it under a loupe of proper magnification while it is illuminated by proper light. Therefore, even when the technique for recording and reconstructing fine 3D images by holography or computer generation is made general at some future time, it will be impossible to avoid their forgery.

SUMMARY OF THE INVENTION

In view of such problems with the prior art as explained above, an object of the present invention is to provide a hologram having authenticating information recorded therein in such a way that it is substantially difficult to view in a normal viewing state, and so having improved counterfeit-proofness.

According to the present invention, this object is achieved by the provision of a 3D image-reconstruction hologram having authenticating information recorded therein, wherein:

a minute object that is the authenticating information is located behind a shielding block of visually easy-to-perceive size, so that the authenticating information is hidden by the shielding block in a given viewing direction and so is not exposed to view, but can be viewed from a direction different from said given direction.

Preferably, the minute object is of visually difficult-to-resolve, and is viewable through a magnifying viewing means.

Preferably, the given direction is a front direction with respect to said hologram.

Preferably, the hologram is recorded in a computer-generated hologram form.

Preferably, the minute object has a maximum size of 300 µm or less.

The shielding block may comprise a pattern constructed of a diffraction grating recorded in a hologram surface.

The minute object may be in a character form.

The minute object may have an angle of radiation of object light, at which the minute object is fully visible on one side of the shielding block.

The distance between the minute object and the shielding block may be determined such that the minute object is fully visible on one side of the shielding block in a direction different from the given direction.

The minute object may be invisible on one side that is opposite to the other side on which the minute object is fully visible.

Preferably, the angle range in which the minute object is partly or wholly visible is equal to or narrower than the angle range in which the minute object is hidden by the shielding block, more preferably ½ of that angle range.

In another embodiment of the present invention, another minute object may be recorded therein such that said another minute object is viewable on one side that is opposite to the other side on which the minute object is fully viewable.

Preferably, the minute object is reconstructed within 1 mm from the surface of the hologram.

The holograms of the present invention may be applied onto a card or a document.

The present invention also includes an authenticating information check system, wherein an illumination optical system and a viewing position are provided such that the minute object in the hologram having authenticating information recorded therein is viewable.

In the authenticating information check system of the present invention, the hologram and the illumination optical system are fixedly provided while the viewing position is relatively movable; the illumination optical system and the viewing position are fixedly provided while said hologram is relatively rotatable; the hologram and the viewing position are fixedly provided while the illumination optical system is relatively movable; or the like.

In the hologram having authenticating information recorded therein according to the present invention, a minute object that is the authenticating information is located behind a shielding block of visually easy-to-perceive size, so that the authenticating information is hidden by the shielding block in a given viewing direction and so is not exposed to view, but can be viewed from a direction different from that said direction; the presence of the authenticating information is little noticeable. Further, even when the hologram is viewed through a magnifying viewing means such as a loupe, the presence of the authenticating information is little noticeable from an ordinary viewing direction. The hologram of the present invention thus ensures that the concealability of the authenticating information is extremely enhanced, and so has much higher counterfeit-proofness.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the inventive hologram having authenticating information recorded therein, the minute object that is the authenticating information cannot be viewed in a given viewing direction but can be viewed only in a certain viewing direction different from that direction. For instance, the authenticating information or minute object is gradually visible from behind the shielding block.

The hologram having authenticating information recorded therein according to the present invention is now explained on the basis of its principles. Although the inventive hologram may be fabricated by ordinary holography as described later, it should preferably be fabricated by computer generation. Thus, a computer-generated hologram (CGH) is first explained.

Figure 6:
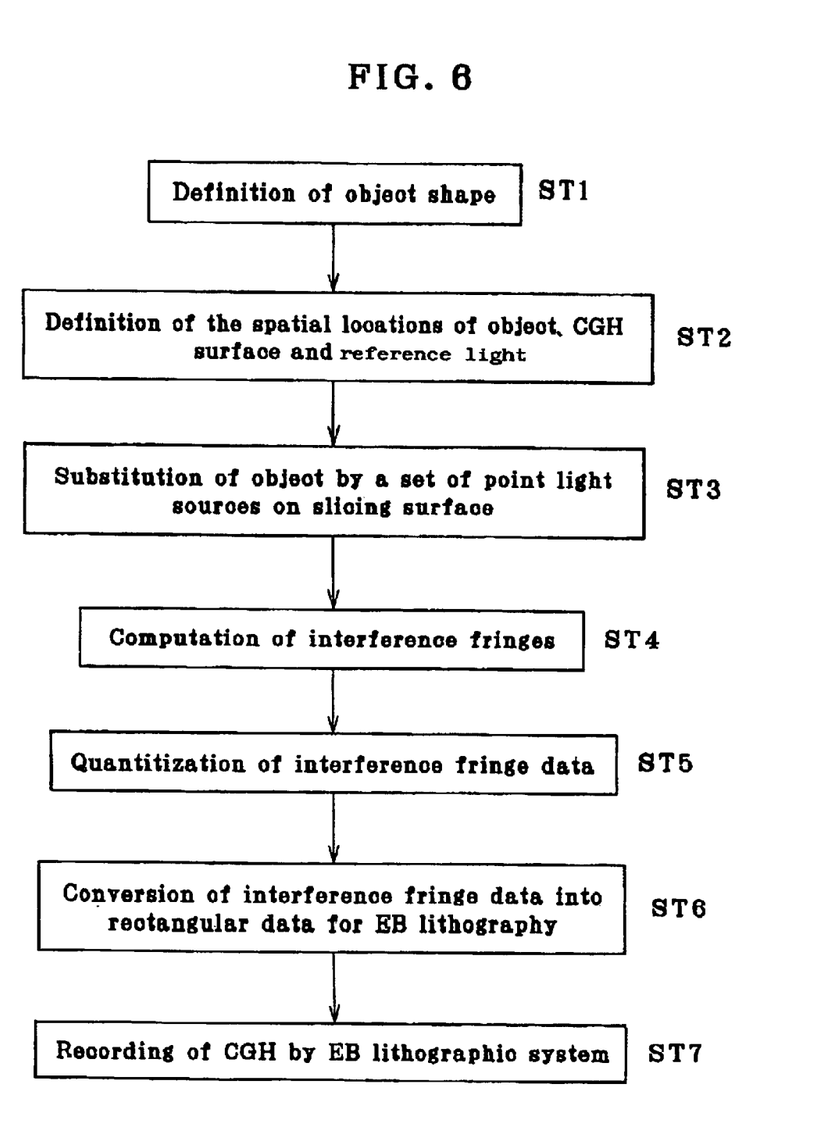
FIG. 6 is a flowchart illustrative of a specific CGH fabrication process.

How to fabricate CGHs is well known (from, for instance, patent publication 1). As an exemplary CGH, a binary hologram obtained by recording an intensity profile of interference fringes is explained. Reference is briefly made to the case where a reconstructed image having parallax in the horizontal direction only is observed while illuminated with white light. As shown in FIG. 6, the shape of an object from which a CGH is obtained is defined at step ST1. At step ST2, the spatial locations of the object, a CGH surface and reference light are then defined. At step ST3, the object is vertically divided by slicing on a horizontal surface, and then substituted on the slicing surface by a set of point light sources. In step ST4, at each sample point defined on the CGH surface, the intensity of an interference fringe of object light coming from each light source forming a part of the object and reference light is computed on the basis of such spatial locations, thereby obtaining interference fringe data. Subsequently, the obtained interference fringe data are quantized at step ST5, and then converted to rectangular data for EB lithography. Finally at step ST7, the data are recorded in a medium by an EB lithographic system, so that a CGH is obtained.

In the computation of interference fringes, the "hidden surface removal" processing is carried out in such a way that when an object is viewed from a certain visual point, a portion of the object hidden by another object placed in front thereof is invisible. By this processing, information of the object that is overlapping is added to a retinal image, applying a 3D appearance thereto. For CGH recording, the hidden surface removal processing is performed by the following steps.

Figure 7:
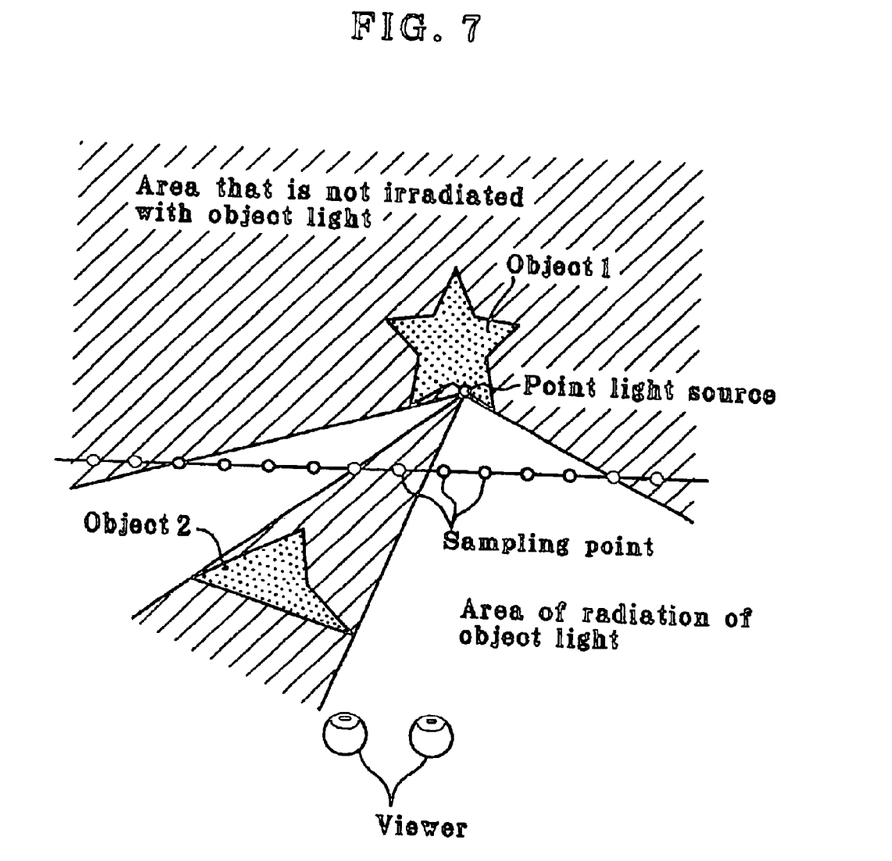
FIG. 7 is illustrative of hidden surface removal processing in the case of a CGH.

For each of point light sources that form an object 1, an area (hatched in FIG. 7) where that light point source is hidden by objects 1 and 2 is found as shown in FIG. 7. In the case of a computer-generated hologram fabricated at the steps of FIG. 6, the objects 1, 2 are sliced on a horizontal surface and have parallax in the horizontal direction alone, and so an area of point light sources for the object 1 hidden by the objects 1, 2 is found from the positions of points and segments on each slice surface. When interference fringe sampling points distributed on a CGH surface are included in the aforesaid area where the point light sources are hidden (shown by black circles in FIG. 7), those sampling points for the point light source are out of computation of interference fringe intensity. This is the hidden surface removal processing. Reconstructing light from the image of the object 1 reconstructed from the thus processed CGH is not diffracted at the hatched area of FIG. 7, so that when the visual point of a viewer comes in that area, the area of the object 1 corresponding to that point light source is invisible because of being hidden by the image of the object 2.

Figure 1:
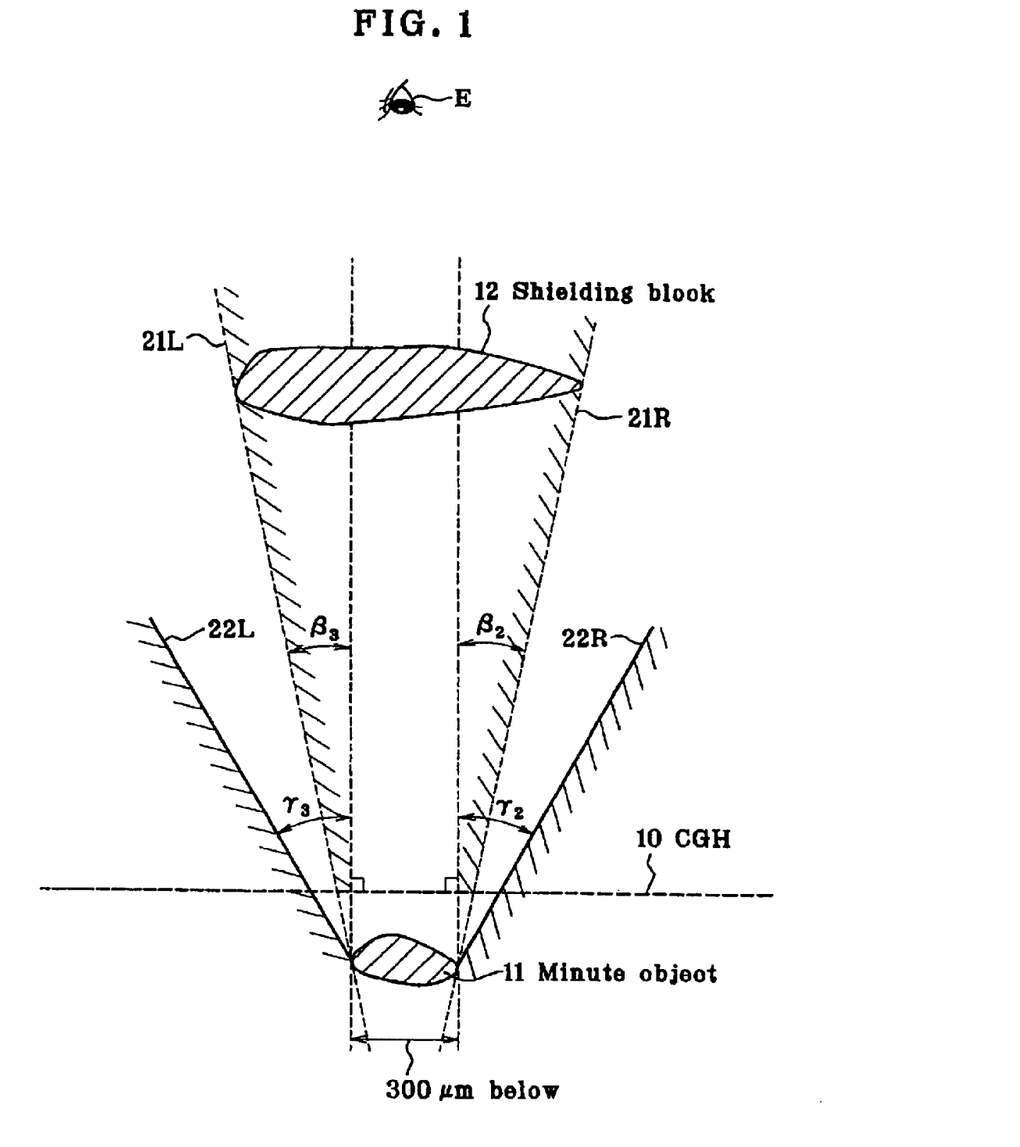
FIG. 1 is illustrative of a minute object and a shielding block recorded in the hologram of the invention and the range of object light.

To achieve the hologram of the present invention, there is provided a minute object 11 used as authenticating information of visually difficult-to-resolve size, specifically, a character or the like of maximum size of 300 μm or less. Then, a shielding block 12 that is larger than the minute object 11 and of visually easy-to-perceive size is located at a position where the front of the minute object 11 can be hidden in such a way that a viewer E cannot view the minute object 11 from the front (from an ordinary viewing direction), that is, at a specific position in front of the minute object 11 (on the viewing side). At that position, the shielding block 12 is recorded in a CGH 10. For this reason, the aforesaid hidden surface removal processing is applied to a set of point light sources representing the minute object 11, and then CGH recording is performed while holding back diffraction of at least reconstructing light from the minute object 11 between a straight line 21L and a straight line 21R shown in FIG. 1. Here the straight line 21L is defined by a straight line passing by the left end of the minute object 11 and the left end of the shielding block 12, and the straight line 21R is defined by a straight line passing by the right end of the minute object 11 and the right end of the shielding block 12. It is understood that the front direction is included between the straight line 21L and the straight line 21R. In FIG. 1, a straight line 22L is drawn upwardly and obliquely from the left end of the minute object 11, indicating a boundary line at a left-hand area of which there is no diffraction of reconstructing light from the left end of the minute object 11, and a straight line 22R is drawn upwardly and obliquely from the right end of the minute object 11, indicating a boundary line at a right-hand area of which there is no diffraction of reconstructing light from the right end of the minute object 11.

The shielding block 12 used herein may be either an ordinary 2D or 3D object or an object comprising a diffraction grating pattern provided on the surface of CGH 10 and known from patent publications 1, 3, 4, etc. In this case, a pattern constructed of a diffraction grating that is the shielding block 12 is directly recorded in a corresponding area on the surface of CGH 10 rather than recorded as a hologram.

Figure 2:
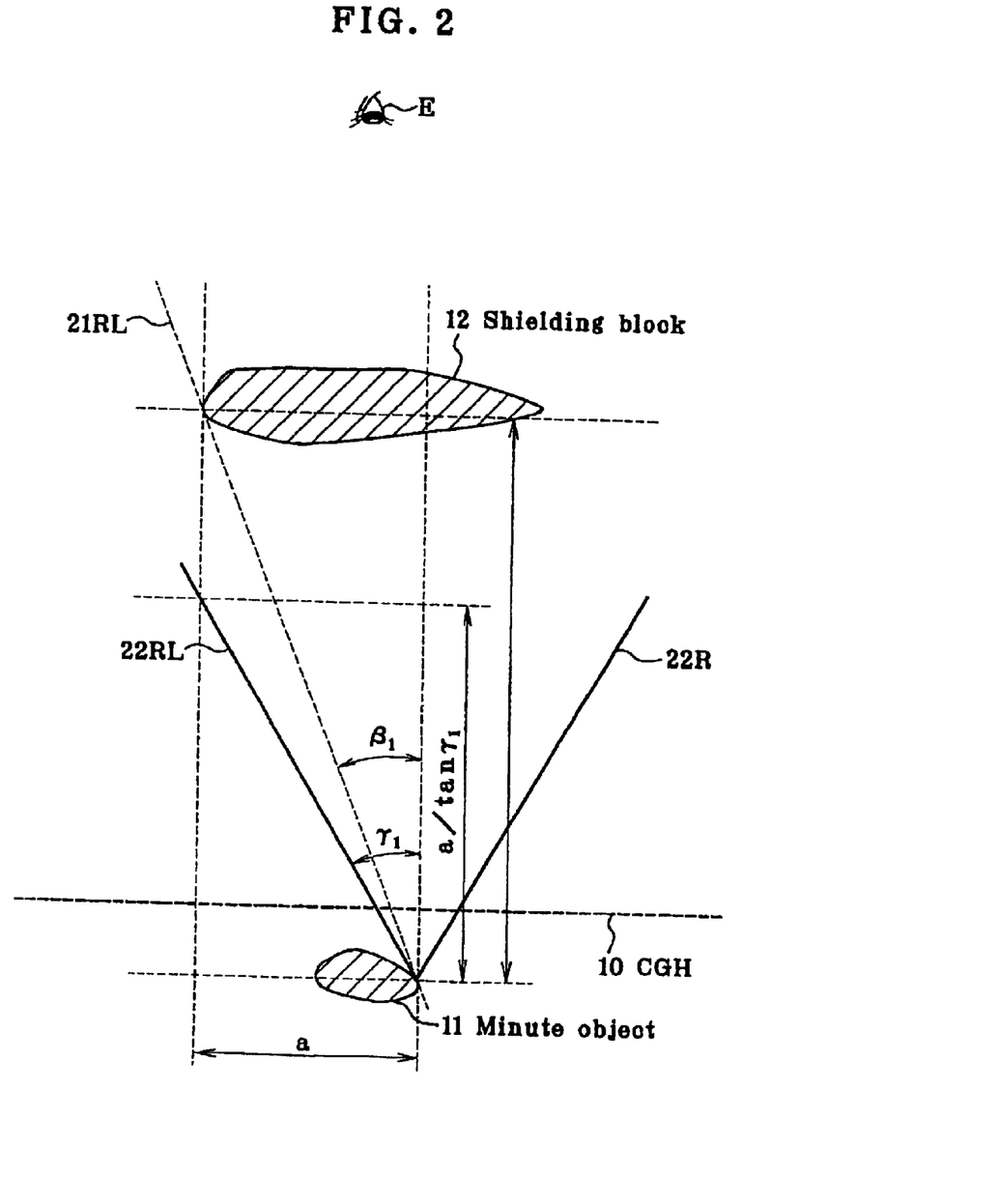
FIG. 2 is illustrative of one arrangement of the invention, wherein the minute object is recorded in such a way as to be fully viewable on one side of the shielding block.

The arrangement of FIG. 2 differs from that of FIG. 1 in that in order to allow a minute object 11 to be fully visible from a direction different from the front direction, for instance, from an obliquely left-hand direction, the angle of radiation, $\gamma_1$, of object light from the minute object 11 is larger than the angle $\beta_1$ of a straight line 21RL connecting the right end of the minute object 11 with the left end of the shielding block 12 with respect to the front direction. To put it another way, when a plane plate is placed between a shielding block 12 and the minute object 11, the angle of radiation, $\gamma_1$, of object light from the minute object 11 is larger than the angle $\beta_1$ at which the tilting of the plane plate maximizes. In FIG. 2, a straight line 22RL is indicative of the left-hand limit to the object light. The same holds true for where the aforesaid different direction is changed to an obliquely right-hand direction. In other words, if the space in the front direction between the shielding block 12 and the minute object 11 is made equal to or greater than a/tan$\gamma$ where $\gamma$ is the angle of radiation of the object light from the minute object 11 and a is the width from the right or left end of the minute object 11 to the left or right end of the shielding block 12, then the minute object 11 is fully visible from an obliquely left-hand or right-hand direction.

Figure 3:
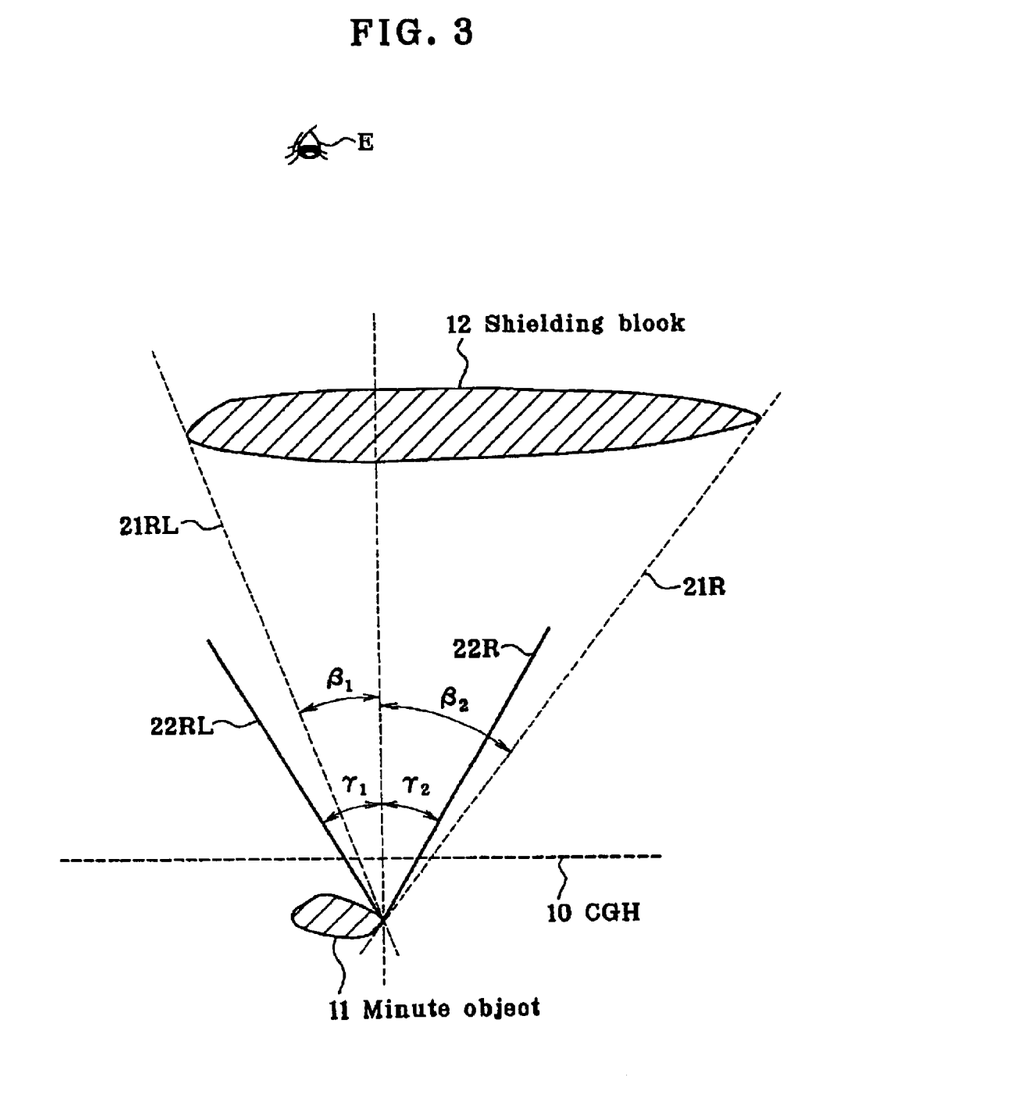
FIG. 3 is illustrative of another arrangement of the invention, wherein the minute object is fully viewable on one side but is fully hidden on the other side and so not exposed to view.

In FIG. 3, a straight line 22R indicative of a right-hand boundary to object light emerging from the right end of a minute object 11 is located inside a straight line 21R passing by the right ends of the minute object 11 and a shielding block 12, and a straight light 22RL indicative of a left-hand boundary to object light leaving the right end of the minute object 11 is located outside a straight line 21RL passing by the right end of the minute object 11 and the left end of the shielding block 12. In this case, the minute object 11 is fully visible on the left side but, on the other side or the right side, it is fully hidden by the shielding block 12 and so is invisible. In terms of angle, the left-hand angle of radiation, $\gamma_1$, of object light from the minute object 11 is larger than the angle $\beta_1$ of a straight line 21RL connecting the right end of the minute object 11 with the left end of the shielding block 12 with respect to the front direction, and the right-hand angle of radiation, $\gamma_2$, of object light from the minute object 11 is smaller than the angle $\beta_2$ of a straight line 21R connecting the right end of the minute object 11 with the right end of the shielding block 12 with respect to the front direction.

Referring back to FIG. 1, the right-hand angle of radiation, $\gamma_2$, of object light from the minute object 11 is larger than the angle $\beta_2$ of the straight line 21R connecting the right end of the minute object 11 with the right end of the shielding block 12 with respect to the front direction, and the left-hand angle of radiation, $\gamma_3$, of object light leaving the minute object 11 is larger than the angle $\beta_3$ of the straight line 21L connecting the left end of the minute object 11 with the left end of the shielding block 12 with respect to the front direction. In this case, the range of angle wherein the minute object 11 is partly or fully visible is found to be $\gamma_2-\beta_2+\gamma_3-\beta_3$ from FIG. 1. On the other hand, the range of angle wherein the minute object 1 is hidden by the shielding block 12 is found to be $\beta_2+\beta_3$. If $\gamma_2-\beta_2+\gamma_3-\beta_3$ is equal to or less than $\beta_2+\beta_3$, it is then possible to make quick authentication by visual observation or using a loupe. If $\gamma_2-\beta_2+\gamma_3\beta_3$ is equal to or less than ½ of $\beta_2+\beta_3$, then the effect on the shielding of the minute object 11 that is authenticating information is much more enhanced; that the minute object 11 has been recorded as authenticating information is difficult to see through, ensuring even higher counterfeit-proofness.

Here the case where the right-hand angle of radiation $\gamma_2$ of object light is smaller than the angle $\beta_2$ so that, on the right side, the minute object 11 is fully hidden by the shielding block 12 and so is invisible is defined by $\gamma_2=\beta_2$, and the case where the left-hand angle of radiation $\gamma_3$ of object light is smaller than the angle $\beta_3$ so that, on the left side, the minute object 11 is fully hidden by the shielding block 12 and so is invisible is defined by $\gamma_3=\beta_3$. Then, the aforesaid relations may be written as $$|\gamma_2-\beta_2|+|\gamma_3-\beta_3|\leq|\beta_2|+|\beta_3|, \text{ or}$$

$$|\gamma_2-\beta_2|+|\gamma_3-\beta_3|\leq\tfrac{1}{2}\times(|\beta_2|+|\beta_3|)$$

Figure 4:
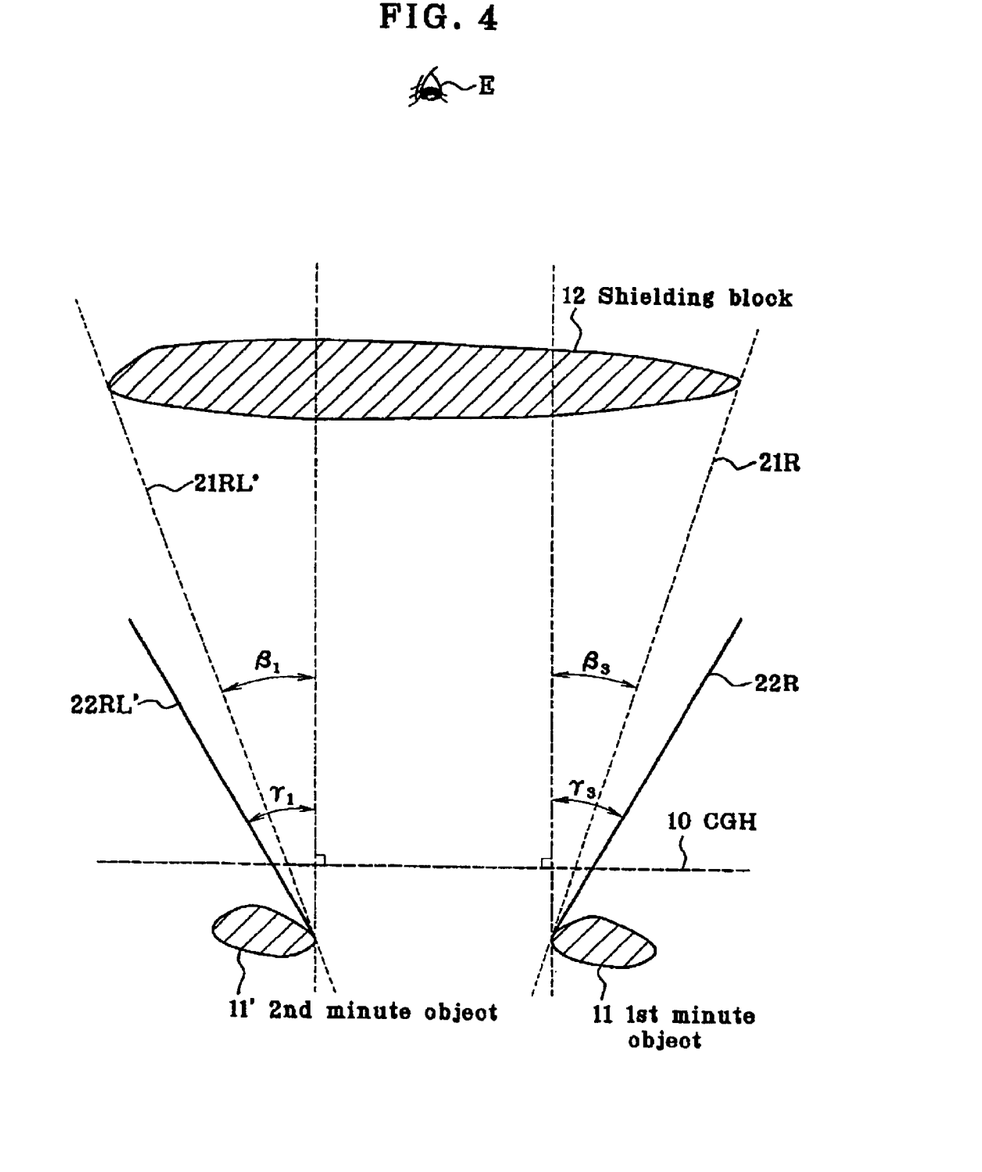
FIG. 4 is illustrative of yet another arrangement of the invention, wherein when two minute objects are recorded, one is fully visible on one side and another is fully visible on the other side.

In FIG. 4, two minute objects 11, 11' are recorded in such a way that the first minute object 11 is fully visible in the angle range $\gamma_3-\beta_3$ on the right side but, on the left side, it is fully hidden and so is invisible while the second minute object 11' is fully visible in the angle range $\gamma_1-\beta_1$ on the left side but, on the right side, it is fully hidden and so is invisible. This embodiment ensures much higher counterfeit-proofness because the minute objects viewed on the right and left sides of the shielding block 12 differ from each other.

In the hologram of the present invention as explained above, the authenticating information (minute objects 11, 11') that is as small as cannot visually be perceived is recorded therein. Accordingly, even when the hologram is irradiated with proper illumination light, the presence of that authenticating information is greatly unlikely to be noticeable. Furthermore, even when the hologram is viewed on an enlarged scale under a loupe or the like, the presence of the authenticating information is little noticeable from an ordinary viewing direction, e.g., from the front. Thus, the concealability of the authenticating information is much more enhanced, considerably reducing the risk of forgery.

For the purpose of authentication, the hologram of the present invention is observed on an enlarged scale under a loupe or the like while illuminated with proper light. As, in this state, the hologram is observed from a direction other than the ordinary front direction, the authenticating information (minute objects 11, 11') develops. As the position of viewing is moved to the front position that is in the ordinary viewing direction, the authenticating information 11, 11' is hidden by the shielding block 12 and so is not exposed to view. In this way, the hologram of the present invention is authenticated.

Further, if the hologram of the present invention is designed such that the minute object 11 does not develop from one side (the right side of FIG. 3) that is opposite to the other side on which the minute object 11 develops from the shielding block 12 (the left side of FIG. 3) as shown in FIG. 3, the concealability of the authenticating information is then much more enhanced.

More effectively, the angle range wherein the minute object 11 is partly or wholly visible should be equal to or less than ½ of the angle range wherein the minute object 11 is hidden by the shielding block 12.

Furthermore, if the hologram of the present invention is designed such that the second minute object 11' develops on one side that is opposite to the other side on which the minute object 11 develops from the shielding block 12 as shown in FIG. 4, its counterfeit-proofness is much more enhanced.

It is noted that the longer the distance between the minute object 11 and the surface of CGH 10, the more the reconstructed image of the minute object 11 is blurred and so the more difficult the image is to view. Thus, it is desired that the minute objects 11, 11' be spaced at most 1 mm away from the surface of CGH 10.

The boundary of diffraction light for reconstruction of the minute object 11 or the angle of radiation of object light has been described as being determined by the hidden surface removal process for CGH fabrication. Even when a hologram is fabricated by two-beam interference, however, an equivalent hologram may be fabricated by using a mask or the like to limit the range of incidence on a hologram medium of object light from the minute object to be recorded. Thus, the present invention is applicable not only to CGHs but also to holograms fabricated by a conventional two-beam interference process.

In use, the hologram of the present invention having authenticating information recorded therein may be applied onto the articles desired to be counterfeit-proof such as cards and documents.

Whether or not a certain hologram has authenticating information recorded therein may be checked as described just below.

The hologram of the present invention is designed such that the authenticating information is viewable only from a specific direction predetermined depending on a specific direction of illumination with reconstructing light. Thus, with an authenticating information check system comprising an illumination optical system and a viewing optical system located in that direction, it is easy to test for genuineness of holograms, and cards, documents or the like onto which they are applied.

Some exemplary authenticating information check systems are now explained with reference to FIG. 5. In one check system of FIG. 5(a), a hologram 100 (corresponding to the CGH 10 in FIGS. 1 to 4) having minute objects 11, 11' and a shielding block 12 recorded therein according to the present invention and an illuminator 101 for illuminating the hologram 100 with reconstructing illumination light are fixedly provided together with a relatively movable camera 102 for viewing the recorded authenticating information on an enlarged scale, so that the direction capable of viewing the authenticating information can be determined.

Figures 5A, 5B:
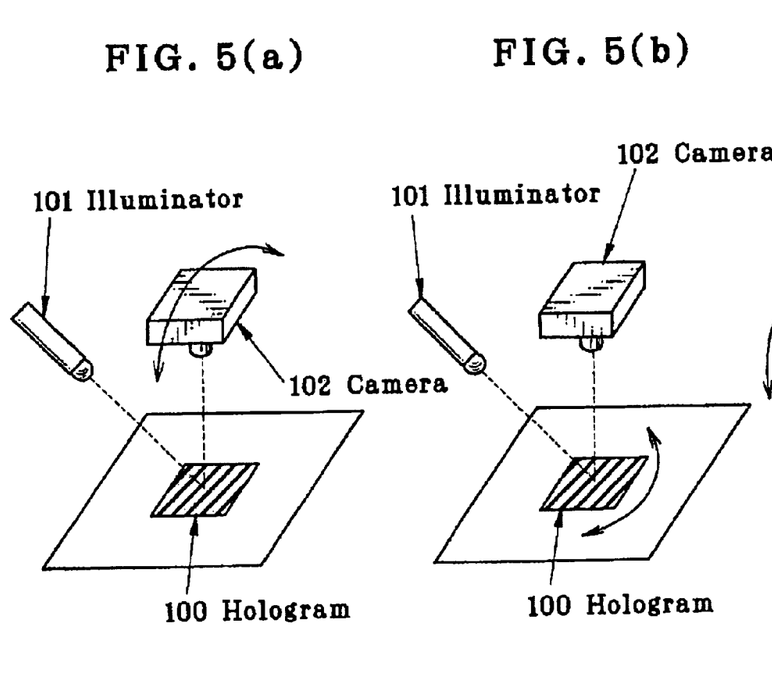
FIGS. 5(a), 5(b) and 5(c) are illustrative of exemplary authenticating information check systems according to the present invention.

In another check system of FIG. 5(b), an illuminator 101 for irradiating a hologram 100 with reconstructing illumination light and a camera 102 for viewing authenticating information recorded in the hologram 100 on an enlarged scale are fixedly provided while the hologram 100 is relatively rotatable, thereby finding the direction capable of viewing the authenticating information. When the hologram 100 is a relief hologram such as a computer-generated hologram, the selectivity of angle by reconstructing illumination light is not very high; even when the illuminator 102 is moved with respect to the hologram 100, the recorded minute objects 11, 11' and shielding block 12 are reconstructed while they are moved. Accordingly, the authenticating information can be viewed where the hologram 100 arrives at a given position, at which whether or not the authenticating information can be viewed can then be checked.

Figure 5C:
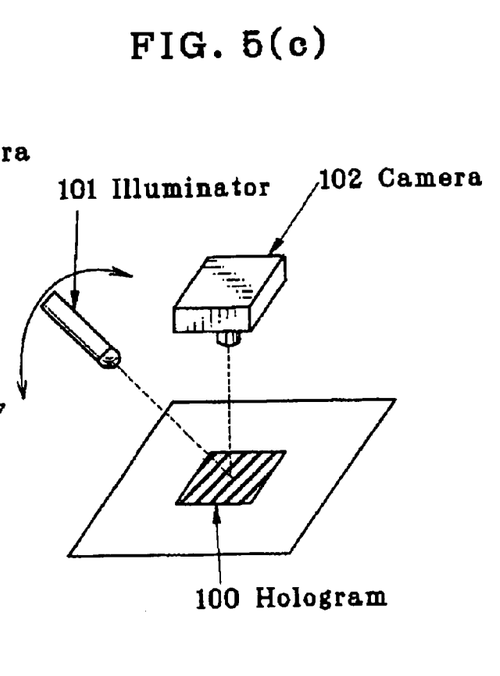

In yet another check system of FIG. 5(c), a hologram 100 and a camera 102 for viewing authenticating information recorded in the hologram 100 on an enlarged scale are fixedly provided while an illuminator 101 for irradiating the hologram 100 with reconstructing illumination light is relatively movable, thereby determining which direction the authenticating direction can be viewed in. In this case, too, even though the illuminator 101 is moved with respect to the hologram 100, the recorded minute objects 11, 11' and shielding block 12 are reconstructed while they are moved. When the illuminator 101 arrives at a given position, the authenticating information can be viewed; at that position, whether or not the authenticating information can actually be viewed is checked.

While the hologram having authenticating information recorded therein according to the present invention has been described with reference to its principles and examples, it is understood that the present invention is never limited thereto and so may be modified in various forms.

As can be seen from the foregoing, in the hologram having authenticating information recorded therein according to the present invention, a minute object that is the authenticating information is located behind a shielding block of visually easy-to-perceive size, so that the authenticating information is hidden by the shielding block in a given viewing direction and so is not exposed to view, but can be viewed from a direction different from that said direction; the presence of the authenticating information is little noticeable. Further, even when the hologram is viewed through a magnifying viewing means such as a loupe, the presence of the authenticating information is little noticeable from an ordinary viewing direction. The hologram of the present invention thus ensures that the concealability of the authenticating information is extremely enhanced, and so has much higher counterfeit-proofness.

What I claim is:

1. A three-dimensional image-reconstruction hologram having authenticating information recorded therein, the hologram comprising:
   a shielding block of visually easy-to-perceive size; and
   a minute object forming the authenticating information which is located behind said shielding block, wherein said minute object is hidden by said shielding block in a given viewing direction such that said minute object can not be viewed from said given viewing direction and can be viewed from a viewing direction different from said given viewing direction.

2. The hologram according to claim 1, wherein said minute object is smaller than said shielding block.

3. The hologram according to claim 1 or 2, wherein said given viewing direction is a front direction with respect to said hologram.

4. The hologram according to claim 1, which is recorded in a computer-generated hologram form.

5. The hologram according to claim 1, wherein a maximum size of said minute object is less than or equal to 300 μm.

6. The hologram according to claim 1, wherein said shielding block comprises a pattern constructed of a diffraction grating recorded in a hologram surface.

7. The hologram according to claim 1, wherein said minute object is in a character form.

8. The hologram according to claim 1, wherein said minute object has an angle of radiation of object light, at which said minute object is fully visible on one side of said shielding block.

9. The hologram according to claim 1, wherein a distance between said minute object and said shielding block is determined such that said minute object is fully visible on one side of said shielding block in said viewing direction different from said given viewing direction.

10. The hologram according to claim 1, wherein said minute object is invisible on one side of said shielding block that is opposite to the other side of said shielding block on which said minute object is fully visible.

11. The hologram according to claim 1, wherein an angle range in which said minute object is partly or wholly visible is equal to or narrower than an angle range in which said minute object is hidden by said shielding block.

12. The hologram according to claim 1, wherein an angle range in which said minute object is partly or wholly visible is equal to or narrower than ½ of an angle range in which said minute object is hidden by said shielding block.

13. The hologram according to claim 1, wherein another minute object is recorded therein such that said another minute object is viewable on one side of said shielding block that is opposite to the other side of said shielding block on which said minute object is fully viewable.

14. The hologram according to claim 1, wherein said minute object is reconstructed within 1 mm from a surface of said hologram.

15. The hologram according to claim 1, which is applied onto a card or a document.

16. An authenticating information check system, comprising:
a three-dimensional image-reconstruction hologram having authenticating information recorded therein, the hologram comprising a shielding block of visually easy-to-perceive size and a minute object forming the authenticating information which is located behind said shielding block, wherein said minute object is hidden by said shielding block in a given viewing direction such that said minute object can not be viewed from said given viewing direction and can be viewed from a viewing direction different from said given viewing direction; and
an illumination optical system comprising a illuminator for illuminating the hologram and a camera for viewing said minute object in said hologram.

17. The authenticating information check system according to claim 16, wherein said hologram and said illuminator are fixedly provided while said camera is relatively movable.

18. The authenticating information check system according to claim 16, wherein said illuminator and said camera are fixedly provided while said hologram is relatively rotatable.

19. The authenticating information check system according to claim 16, wherein said hologram and said camera are fixedly provided while said illuminator is relatively movable.

* * * * *